March 9, 1971  W. UHRIG  3,568,266
FASTENER ELEMENTS
Filed May 20, 1969  3 Sheets-Sheet 1

INVENTOR
WILHELM UHRIG

BY
Abraham A. Saffitz
ATTORNEY

March 9, 1971 W. UHRIG 3,568,266
FASTENER ELEMENTS
Filed May 20, 1969 3 Sheets-Sheet 2
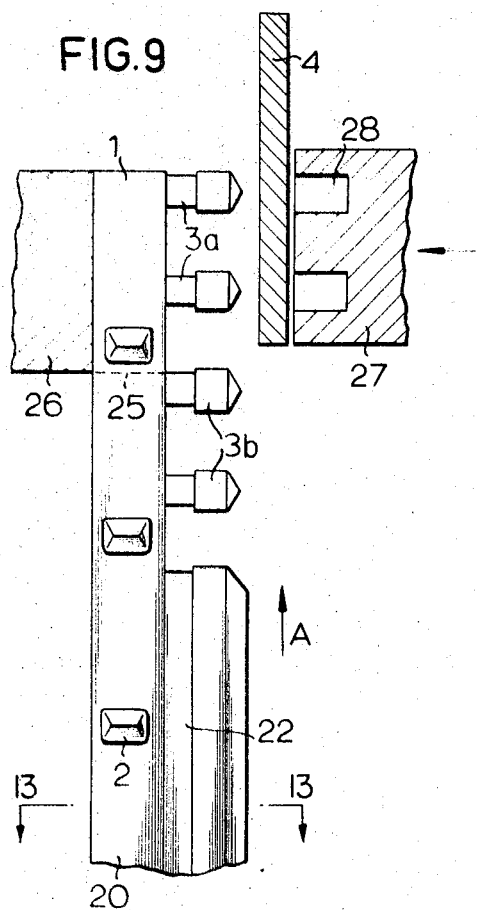
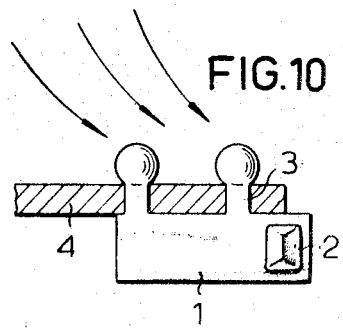
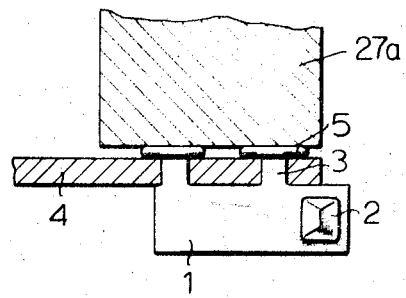
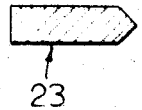
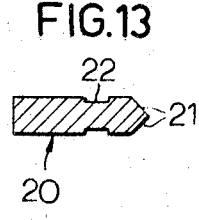
INVENTOR
WILHELM UHRIG
BY
Abraham A. Saffitz
ATTORNEY March 9, 1971 W. UHRIG 3,568,266
FASTENER ELEMENTS
Filed May 20, 1969 3 Sheets-Sheet 3
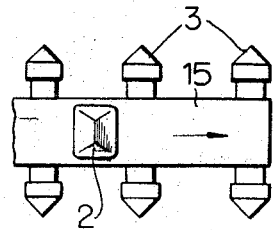
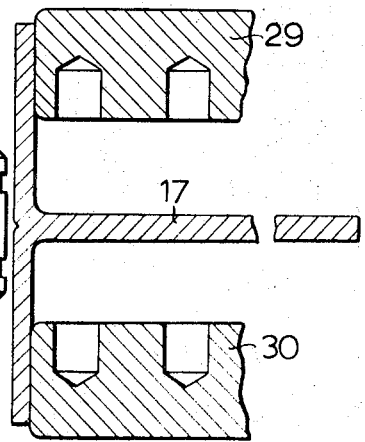
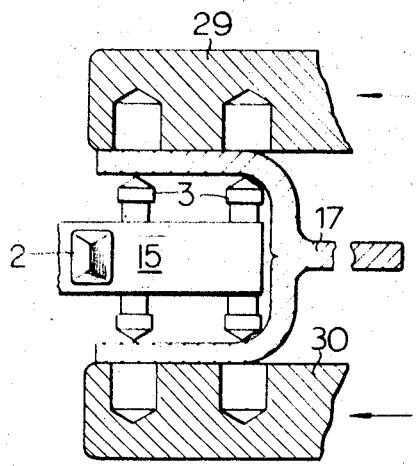
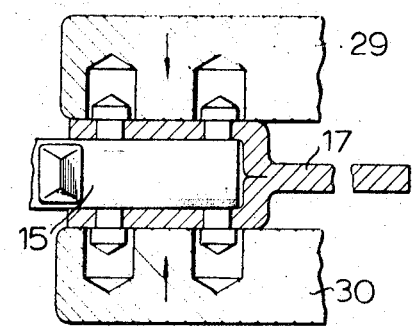
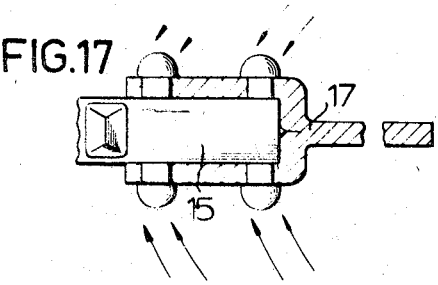
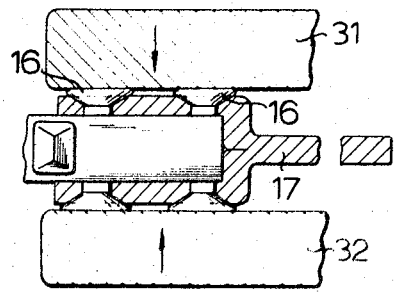
INVENTOR
WILHELM UHRIG
BY
*Abraham A. Saffitz*
ATTORNEY

United States Patent Office 3,568,266
Patented Mar. 9, 1971

3,568,266
FASTENER ELEMENTS
Wilhelm Uhrig, Wuppertal-Elberfeld, Germany, assignor to Supla Etablissment, Vaduz, Liechtenstein
Filed May 20, 1969, Ser. No. 826,236
Claims priority, application Germany, May 27, 1968, P 17 60 491.0
Int. Cl. A44b 19/06, 19/40
U.S. Cl. 24—205.1   5 Claims

ABSTRACT OF THE DISCLOSURE

A slide fastener element is formed from a thin plastic block. The coupling means which interlock the successive fastener elements is carried by the faces of the block. Pointed securing means extend from a narrow side of the block. The pointed securing means may be in the form of pointed pins or prongs. The securing means are forced into and penetrate the supporting tape and extend beyond the tape. The extending portions of the securing means are heated and thereafter, are headed whereby the element is positively secured to the tape.

---

The fastener elements are formed from plastic strip material. One longitudinal side of the strip is formed to present a sharp edge. The strip is successively fed to tools which progressively form the coupling means at spaced intervals along the strip, punch out sections along the sharp edge to form pointed pin formations between the coupling means, force the pin formations into a tape and sever a fastener element from the strip, and thereafter heat and head the portions of the pin formations which have penetrated the tape and extend therebeyond.

For a tape having a Y-shaped cross section, the pointed pin formations are duplicated on the other longitudinal side of the strip and, thereby, on the fastener element so that both arms of the Y are penetrated by pointed pins, which pins are heated and headed to secure the element to both arms.

This invention relates to novel unitary fastener elements for slide fasteners which are formed of low cost thermoplastic material and have stamped therein a nestable socket and stud coupling for joining adjacent fastener elements and which are further provided with improved pinning means to secure the fastener elements to a woven, braided or knitted supporting flexible tape. The invention includes a novel method for fabricating the novel slide fastening elements and for securing these elements to the flexible woven tape.

Numerous types of slide fasteners comprising separate metal links are known in the prior art, but most of these known fasteners employ V-shaped clasps which are mounted around the edge of the supporting tape and these require a bead reinforcement along the length of the tape which firmly secures the clasps to the tape. If the fastener links are formed of heat-softenable resinous material or of commercially available thermoplastic resins, the separate links cannot be secured to the supporting tape with the reinforcing bead in the same manner as with the known metal slide fasteners.

Prior slide fasteners formed of separate plastic links made by injection molding have a tendency to open after the slide fastener has been closed and this is due to the fact that the injection molded plastic has poor dimensional stability and separates under stress. Further, it is costly to join the supporting woven tape to the plastic links by following known injection molding procedures. The high cost of tape-fastener assembly and the poor performance of the slide fastener due to inadequate interfitting of the plastic links have not enabled the slide fastener art to progress to the point where economies of mass production by injection molding and low raw material cost can be fully realized.

It is an object of the present invention that the individual fastener elements for slide fasteners include, within the unitary construction of generally rectangular shape, socket and stud fastening means of novel design with unique pinning features for precision attachment of successive fastener elements to the flexible supporting tape and that the slide fasteners can be manufactured at low cost by simple non-molding procedures.

The known joining procedures based on injection molding lay the supporting tape in a mold which forms the individual fastener links in the cavities thereof and produces, by batch operation, the molded composite of tape and array of links joined thereto.

In contrast, the method of the present invention utilizes strips of plastic which are treated by punching and cutting in a continuous manner to form individual elongated plastic fastener eleemnts therefrom and to deform these elements to provide nestable socket and stud coupling areas and pinning elements in separate deforming and cutting stages and, thereafter, assemble the slide half by pinning these fastener elements to the supporting tape by simple mechanical procedures. The present method is more economical than injection molding and produces a fastener which resists accidental opening after it has been closed.

The known injection molding procedure is slow because the fastener-tape assembly must be slowly cooled to assure that no deformation of the plastic links will occur after the mold is opened. This disadvantage is not present in the method of the present invention because the starting material has no complex corners which require expensive molds and because the fabricating and joining operations do not liquefy the thermoplastic material as is the case in injection molding where the plastic in liquid form must be forced into the mold under high pressure and high temperature to fill all of the cavities therein.

It is a further object of the invention to provide a slide fastener which has elongated individual fastener links of plastic material, which can be mass produced at great speed, and which is distinguished by high dimensional stability, resistance to accidental opening by normal stresses and which possesses high flexibility to render it especially useful in all types and weights of garments.

This object is achieved in a slide fastener according to the invention by providing a set of elongated fastener elements or links and pinning these to a supporting tape with pin means projecting from said elements, and by providing coupling formations projecting over the tape edge so that said set of links may be coupled in normal interdigitating arrangement with a corresponding set secured to the other half of supporting tape at the narrow longitudinal joining edge or face. The fastener elements or links are on the edge of the tape and their lengths are disposed transversely to the supporting tape. The fastener elements carry pin securing elements which are projecting formations at one or both of the narow longitudinal faces of the elongated body and these pin elements penetrate through the supporting tape. The pins are flattened and provide a row at the back of the supporting tape which does not create unwanted stiffness of the slide fastener.

According to a broad aspect of the present invention, there is provided a slide fastener comprising elongated individual fastener links of plastic material, each of which is secured to a supporting tape at a narrow longitudinal face of a body portion. If a tape of Y-shaped cross section or a double thickness tape is used, the links may be secured to the tape at two of the faces.

In a preferred form of construction, the fastener elements are small, substantially rectangular blocks which are mounted on one side of the supporting tape perpendicularly to the plane thereof and which are provided with a pin or pins on a narrow edge thereof penetrating through the tape at the narrow face which is adjacent the tape. In this case, the fastener links, and consequently the coupling means thereon are situated outside the plane of the supporting tape.

In another form, the fastener elements may consist of small, substantially L-shaped plates and, in the angle of the L, the edge of the supporting tape lies with the coupling means being located in or symmetrically disposed with respect to the plane of the supporting tape. The other leg of the L carries the coupling means which is disposed in front of the edge of the supporting tape. As a result of this L-shaped plate embodiment, tilting of the slide fastener under heavy tensile loading is prevented and the easy running of the slide is assured during the opening and closing function.

In a further form, the arms of the fastener elements are disposed in front of an edge of the supporting tape. The arms thus comprise an extension and prong means which extends through and over the supporting tape. The ends of the arms penetrating through the supporting tape are joined together by heating and pressing. This ensures that the normal tensile stress, directed across the dividing line of the fastener is taken up symmetrically by the supporting tape.

Provision may be made for the fastener links to comprise pins symmetrically disposed on two opposite faces thereof, by means of which the links are anchored in a Y-shaped or double thickness supporting tape. In this case, too, there is provided a slide fastener which is symmetrical about a medial plane defined by part of the supporting tape, with the advantages of high resistance to bursting open and easy running of the slide.

The invention also permits the production of a concealed slide fastener. For this purpose, the fastener links are secured to the supporting tape with their coupling formations situated opposite a central region of the supporting tape, and the supporting tape is folded back over the attached portion of the tape.

Fastener links according to the invention may consist of undrawn or drawn plastic material, but the fastener links are preferably of drawn plastic material. The fastener links may also consist of a plastic material with a fiber insert.

The method of producing the slide fastener according to the invention is characterized essentially in that the fastener links are produced, with pins which are originally pointed, by stamping and punching them out of a strip of plastic material, the pins being pushed through the supporting tape and then having their free projecting ends flattened or bent over under the action of heat. The free ends of the pins may be thickened under the action of heat and pressure so that they engage behind the back of the supporting tape, the molten plastic material at the same time penetrating into the fabric of the tape so that, as a result, the fastener links are permanently secured thereto in precise locations.

With the foregoing more important objects and features in view and such other objects and features as may become apparent as this specification proceeds, the invention will be understood from the following description taken in conjunction with the accompanying drawings, wherein like characters of reference are used to designate like parts, and wherein.

Figure 2:
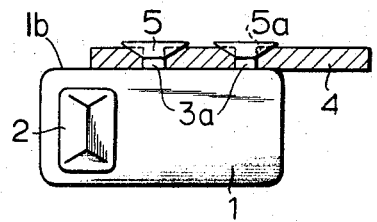
FIG. 2 is a view similar to that of FIG. 1 illustrating the final assembly step.
Figure 4:
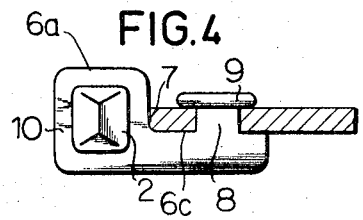
Figure 5:
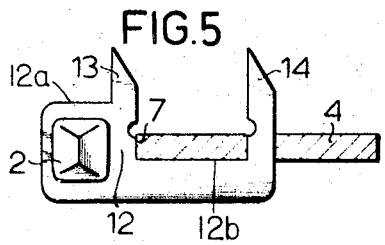
Figure 6:
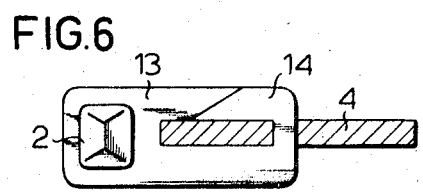
Figure 7:
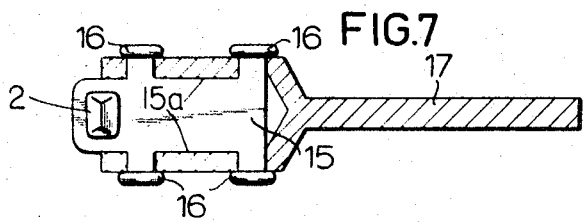
Figure 8:
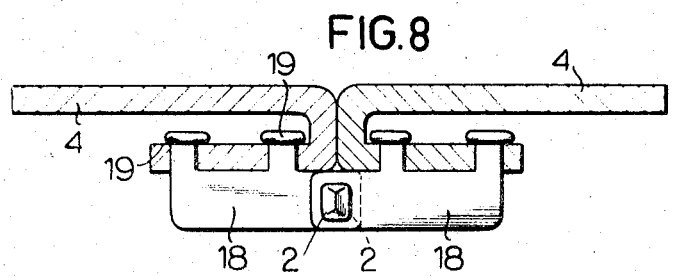

FIG. 5 and FIG. 6 similarly show still another embodiment of fastener element construction;

FIG. 7 is a section through half a slide fastener with a Y-shaped supporting tape including a fastener element of special construction;

FIG. 8 is a section through a concealed slide fastener;

FIGS. 9, 10 and 11 illustrate successive steps in the manufacture of a fastener of the type shown in FIGS. 2 and 4;

FIGS. 12 and 13 are sectional views of a plastic material strip used in the manufacture of the fastener elements or links; and, FIGS. 14 to 18 show successive steps in the manufacture of the Y-shaped slide fastener of FIG. 7.

Figure 1:
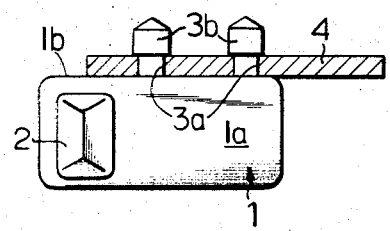
FIG. 1 is a section through half a slide fastener illustrating a step in the method of securing a fastener element to the tape.

In FIGS. 1 and 2, the individual fastener elements each comprise a rectangular block 1 composed of suitable thermoplastic or heat-softenable resinous material having a hollow protrusion adjacent a side thereof which forms a nestable socket and stud coupling between successive fastener elements. The socket and stud coupling 2 presents a convex surface on face 1a of the fastener element and a concave surface on the opposite face of the fastener element and this concave surface forms a depression serving as the socket while the convex surface forms the head or stud. In the closing of the two halves of the slide fastener on the tape, the stud of one of the slide fastener elements fits into the socket formation of the corresponding fastener element on the opposite tape.

The rectangular block 1 is provided with a plurality of projecting pin elements 3 at the top narrow edge surface 1b of the block and integral therewith. The pin elements in FIGS. 1 and 2 are each provided with undercut portions 3a near the base thereof and tape penetrating portions 3b at the top thereof, these portions 3b being pointed and having conical or pyramidal shape. Fastener tape 4 which is made in the usual manner from conventional woven, braided or knitted fabric is secured along its width to each of the successive fastener elements 1 by means of the pins 3, in accordance with the method of fabrication set forth in detail hereinbelow.

The points 3b of pins 3 aid in penetrating and forcing the pins through the woven fabric of the tape 4. The pins 3 are of the same plastic material as the block, and are softenable by heat so that they are easily deformed by a heated tool to form heads 5 on pins 3, as shown in FIG. 2. The heated head areas may be forced more deeply into the fabric to form the sides of the plastic heads 5 with a tapered sectional shape so as to be countersunk in the fabric of the tape, as shown at 5a of FIG. 2.

Figure 3:
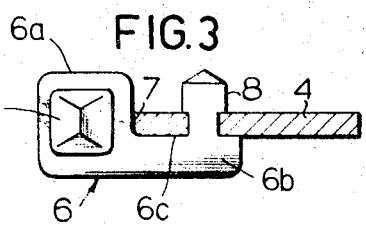
FIG. 3 and FIG. 4 are similar to FIGS. 1 and 2, respectively, but illustrate different fastener element structure.

In FIGS. 3 and 4, another structural embodiment of the fastener element 6 is shown in which the configuration is L-shaped rather than rectangular, as in FIGS. 1 and 2. The outer edge of the fastener element, which is shown at the left of FIG. 3, is formed as leg 6a of the L-shaped fastener element and this leg 6a carries hollow protrusion 2 forming the nestable socket and head coupling while the horizontal leg 6b carries the tape penetrating pin 8 which extends from the inner narrow edge surface 6c. The nesting socket and head coupling 2 in FIGS. 3 and 4 is identical to that in FIGS. 1 and 2.

The inner edge of leg 6a abuts the outer edge 7 of tape 4. The penetrating pin 8 which has the same form as pins 3 and 4 in FIG. 1 pierces the fabric of tape 4 and a heated tool is pressed against the pointed end to flatten the softened thermoplastic material and thereby form rounded head 9, as shown in FIG. 4. The tape 4 is securely held at its outer edge by leg 6a and it is also held by the enlarged head portion 9.

The assembly of tape 4 and rectangular fastener elements 1 in FIG. 1 is bulkier and less compact than the assembly of tape 4 and L-shaped fastener elements 6 in FIGS. 3 and 4. Further, the hollow nesting socket and head couplings 2 in FIGS. 3 and 4 are each in alignment with tape 4 which effectively eliminates any bending movements and pulling or tensile stresses which occur after closing of the slide fastener. Accordingly, the embodiment shown in FIGS. 3 and 4 is especially adapted to resist accidental opening by stressing after the slide fastener is closed and this embodiment is adapted for narrower concealed slide closures.

FIGS. 5 and 6 illustrate a further embodiment of the invention in which the fastener element 12 has a body portion carrying the nestable socket and head coupling 2 and pointed extension 13 and prong means 14 which project from interior narrow edge surfaces 12b of the body portion and a horizontal base portion 12a of the body, respectively. These pointed parallel extension 13 and prong means 14, when deformed inwardly toward each other after penetration by extension 14, secure and envelop a transverse section of the tape 4 within a cavity formed by surface 12b and means 13 and 14 which are folded inwardly toward each other to join along their tapered edges, as shown in FIG. 6.

In FIG. 7, there is illustrated a special embodiment of fastener element 15 which is uniquely adapted in the fabrication of a slide fastener having a Y tape as an element thereof. The rectangular fastener element 15 is formed of thermoplastic material and includes adjacent the outer side edge a nestable socket and head coupling 2 and two pairs of projecting pins 16 extending from the upper and lower narrow edge surfaces thereof. These two pairs of symmetrically arranged pins 16 are anchored to the legs of the Y. The form of pins 16 is substantially the same as that of pins 3 in FIGS. 1 and 2. The flattening of the penetrating portion of the pins 16 provides a rounded head similar to the rounded head of FIG. 4.

In FIG. 8, there is illustrated an embodiment of the invention in which the slide fastener is concealed and the fastener element 18 is of generally rectangular shape, similar to the fastener element of FIGS. 1 and 2, but in which the tape 4 is bent backwardly in order to conceal the heads 19 of the fastener element 18. FIG. 8 further shows the interlocking engagement of the coupling means of two fastener elements in side-by-side relation.

In FIGS. 9–13, there are shown the method and apparatus for fabricating the fastener elements and for securing these elements to the tape.

A thermoplastic strip 20, which may be formed by conventional molding procedures, preferably by extrusion or injection molding, is provided with chamfered narrow side surfaces, taped at edges 21 to form a sharp edge means, and with opposite grooves 22 in top and bottom surfaces of said strip adjacent said tapered edges 21.

Strip 20 is fed under a conventional forming tool (not shown) for deforming the flat portion remote from the groove and the tapered edge into the nestable socket and head coupling 2. This deformation is accomplished in the usual manner under the action of heat and pressure.

In the next stage of manufacture, the pins 3 are formed by removing the plastic material by cutting or stamping from successive spaces of equal breadth and shape along the longitudinal tapered edge means 21. Grooves 22 in the upper and lower faces of the strip form the undercut portions 3a of successive pins while tapered sharp edge means 21 form the pointed pyramidal heads 3b of the pins. The cutting tool with sharp edge means 21 forms the taper of the four sides of pyramidal tip 3b. The width of groove 22, which defines the extent of the undercut portion 3a, is equal to or slightly larger than the thickness of supporting tape 4, thereby assuring an accurate fit of the tape 4 after penetration by the fastener 3.

The strip 20 is then advanced to the tape securing station where tape 4, supported on element 27, is brought into fabric piercing relation against pins 3, as shown by the movement of the arrow at the top of FIG. 9. Ram 26 holds the portion of the strip and supplies the backing force for holding the strip under the piercing force of element 27.

Thereafter, ram 26 severs the portion of the strip secured to the tape along line 25, whereby a complete fastener element secured to the tape is formed.

In an alternate process for securing the fastener element to the tape, ram 26 may be moved relative to the element 27 to sever fastener element 1 along line 25 from the strip 20 and to bring pins 3 into contact with tape 4 which overlies sockets or bores 28 of element 27. These bores 28 will accommodate the penetrating movement of the pins 3 which have pierced the tape and bring the undercut portions 3d of the pins into registry with the thickness of the tape 4.

The next operation is shown in FIG. 10 wherein hot air, whose flow and direction is represented by the arrows shown in the figure, serves to soften the pyramidal tips and head portions of pins 3 to create a bulbous form of softened plastic material of the head. This bulbous soft head is then deformed by tool 27a to produce the flat disc head 5 as shown in FIG. 11.

FIG. 12 illustrates another alternative cross sectional shape of strip 20 wherein the upper grooves and lower grooves 22 are absent.

In order to produce slide fasteners, it is also possible to start with a strip of plastic material of the cross section as shown in FIG. 12, which is plane at both upper and lower faces. The longitudinal grooves 22 which are cut in the profile of the strip are shown in FIG. 13 at the front and rear edge faces. These grooves are made in the strip before the sides are undercut with the cutting tool. The fastener undercut on four sides is held more securely after being inserted in the supporting tape 4 and can no longer fall out of the supporting tape 4 during further transport to the deformation station for the free ends of the pins 3.

In the embodiment of FIG. 12, the pins formed by cutting the strip 23 will not have undercut portions 3a and the stem will have a straight contour.

During the pressing flat of the bulbous softened plastic material of FIG. 10, the head may be alternatively pressed into the fabric of the supporting tape 4 so that the head 5 lies within a portion 5a (see FIG. 2) inside the supporting tape 4. In this alternative case, it is also possible to press the partially melted ends of the pins 3 completely into the fabric of the supporting tape 4.

The manufacture of the symmetrical slide fastener shown in FIG. 7 is illustrated in FIGS. 14 to 18. The fully punched and stamped fastener link 15, still supported by the remaining strip of plastic material, is conveyed to the Y-shaped supporting tape 17, the arms of which are spread wide apart (FIG. 14). Then the two arms of the supporting tape are laid, by means of two rams 29, 30 over the pointed pins provided at both the upper and lower faces of the fastener link 15 (FIG. 15). Then the two rams 29, 30 are brought toward one another, in the course of which the pins penetrate through the arms of the supporting tape 17 and their ends are received by corresponding recesses in the rams 29, 30 (FIG. 16).

Duing the next operation, the rams 29, 30 are restored to their initial position and the fastener link 15 is severed and separated from the rest of the strip of plastic material. Then the supporting tape 17, together with the fastener link 15 inserted therein, is moved to the next station whereat the ends of the pins are pressed into the flat heads 16, using hot air (FIG. 17) and the rams 31, 32 (FIG. 18).

Although preferred embodiments of the invention have been disclosed for purposes of illustration, it will be evident that various changes and modifications may be made therein without departing from the scope and spirit of the invention.

What is claimed is:

1. A slide fastener comprising:
   (a) a tape having a U-shaped edge portion;
   (b) a plurality of relatively thin molded unitary fastener elements formed of thermoplastic material, each of said elements having straight upper and lower edge portions;
   (c) means for fastening said elements to said tape including pairs of integral projecting pins which extend substantially perpendicularly from at least one of said edges through at least one leg of said U-shaped edge portion of said tape to anchor said tape;
   (d) each of said projecting pins having a head portion which is integral therewith and extends beyond the peripheral edge of the pin substantially in all directions;
   (e) said head portions engaging at least one leg of said edge portions of said tape to clamp against said leg; and,
   (f) a socket and stud coupling means formed in each of said fastener elements as a convex indented surface on the top face of the element at a location remote from the edge of said tape and formed as a concave surface on the bottom face of said element, whereby the coupling means in one fastener element is nestable in the coupling means of an adjacent fastener element so that, in closing the two halves of the slide fastener, the stud of one fastener element fits into the socket of the corresponding fastener element of the opposite tape with its correspondingly attached fastener element.

2. A slide fastener as claimed in claim 1, wherein the tape is of a Y-shaped cross-section.

3. A slide fastener as claimed in claim 1, wherein said means for fastening said elements includes two pairs of pins on each upper and lower edge of said fastener element.

4. A slide fastener as claimed in claim 1, wherein said means for fastening said elements consists of one pair of pins projecting from the upper edge of said fastener element.

5. A slide fastener as set forth in claim 1, wherein the tape is of sufficient width to be folded over the fastening means passing therethrough to conceal the same.

References Cited

UNITED STATES PATENTS

| 2,191,874 | 2/1940 | Winterhalter | 24—205.1 |
| 2,296,468 | 9/1942 | Feist | 24—205.1 |
| 2,306,873 | 12/1942 | Feist | 24—205.1 |
| 2,496,926 | 2/1950 | Winterhalter | 24—205.13X |
| 3,037,255 | 6/1962 | Ryser | 24—205.1 |

FOREIGN PATENTS

| 571,691 | 9/1945 | Great Britain | 24—205.13 |
| 615,935 | 1/1949 | Great Britain | 24—205.1 |

BERNARD A. GELAK, Primary Examiner

U.S. Cl. X.R.

24—205.13